United States Patent [19]
Le et al.

[11] Patent Number: 5,699,538
[45] Date of Patent: Dec. 16, 1997

[54] EFFICIENT FIRM CONSISTENCY SUPPORT MECHANISMS IN AN OUT-OF-ORDER EXECUTION SUPERSCALER MULTIPROCESSOR

[75] Inventors: Hung Qui Le; Kimming So; Bao-Binh Truong, all of Austin, Tex.

[73] Assignee: International Business Machines Corporation, Armonk, N.Y.

[21] Appl. No.: 352,467

[22] Filed: Dec. 9, 1994

[51] Int. Cl.⁶ .................. G06F 9/312; G06F 9/38
[52] U.S. Cl. .................. 395/394; 395/468; 395/477; 395/800
[58] Field of Search .................. 395/375, 446, 395/448, 468, 474, 485, 725, 800, 477, 478, 479, 394, 726, 728

[56] References Cited

U.S. PATENT DOCUMENTS

| | | | |
|---|---|---|---|
| 4,794,521 | 12/1988 | Ziegler et al. | 395/457 |
| 4,985,827 | 1/1991 | Hamanaka et al. | 395/800 |
| 4,991,090 | 2/1991 | Emma et al. | 395/185.03 |
| 5,016,168 | 5/1991 | Liu | 395/392 |
| 5,148,536 | 9/1992 | Witek et al. | 395/467 |
| 5,185,871 | 2/1993 | Frey et al. | 395/381 |
| 5,191,649 | 3/1993 | Cadambi et al. | 395/200.05 |
| 5,197,130 | 3/1993 | Chen et al. | 395/800 |
| 5,201,041 | 4/1993 | Bohner et al. | 395/465 |
| 5,208,914 | 5/1993 | Wilson et al. | 395/859 |
| 5,261,109 | 11/1993 | Cadambi et al. | 395/291 |
| 5,265,233 | 11/1993 | Frailong et al. | 395/445 |
| 5,420,991 | 5/1995 | Konigsfeld et al. | 395/477 |
| 5,428,761 | 6/1995 | Herlihy et al. | 395/457 |
| 5,467,473 | 11/1995 | Kahle et al. | 395/800 |

*Primary Examiner*—Parshotam S. Lall
*Assistant Examiner*—Viet Vu
*Attorney, Agent, or Firm*—Mark E. McBurney; Brian F. Russell; Andrew J. Dillon

[57] ABSTRACT

Two processor controls for supporting efficient Firm Consistency while allowing out-of-order execution of Load instructions is provided. The Touch control operates when the processor stores a subsequent Store in a pending Store buffer while awaiting any outstanding Loads or Stores. The efficiency of the pending Store is improved by issuing a Touch of the data which pre-loads the line of data in the cache that is the subject of the store. The processor can complete out-of-order execution of a subsequently issued Load relative to a prior Load, but only to its finished state. The subsequently issued Load is not allowed to complete until the prior Load is completed. The Finished Load Cancellation control ensures that Firm Consistency is maintained by canceling any finished Loads, and subsequent instructions, when the subject of the Load is the same as an invalidation request from a multiprocessor.

10 Claims, 3 Drawing Sheets

EFFICIENT FIRM CONSISTENCY SUPPORT MECHANISMS IN AN OUT-OF-ORDER EXECUTION SUPERSCALER MULTIPROCESSOR

BACKGROUND OF THE INVENTION

1. Technical Field

The present invention relates in general to memory systems for computers, and more particularly to improved memory models for use in a multiprocessor data processing system.

2. Description of the Related Art

A multiprocessor system includes a number of processors connected to a memory system. Processors typically interact with the memory system using Loads, Stores, and other synchronization operations such as atomic Load-Store. When running a program, processors may execute register to register operations, such as adding the contents of one register to another register, or performing a subroutine call; however, these operations do not affect the behavior of the memory system as observed by other processors. This behavior of the memory system as observed by the processors is referred to as the "memory model".

A "specification" of the memory model is a description of how the memory system ought to behave. The main purpose of such a specification is to allow hardware designers and programmers to work independently, while still ensuring that any program will work as intended on any implementation of a computer system that conforms to the specification. Ideally, a specification should be "formal", such that conformance to the specification can be verified at some level. In practice, however, in many instances the specifications are "informal" or even nonexistent, in which case a particular hardware implementation becomes the specification of the memory model by default.

The memory model applies to single as well as multiple processor systems. Memory is modeled as an N port device, where N is the number of processors. A processor communicates with the memory system by issuing memory operations. A processor issues the operations through its respective port.

A memory model may range anywhere from Strong (or Sequential) Consistency to different types of Weak Consistency. Strong Consistency is the memory model that most programmers are familiar with. In a Strong Consistency model, the memory operations of all processors appear to execute in a single global order that is compatible with the issuing order of the individual processors. While this model is intuitively appealing and generally understood, it is also the one that provides the worst performance, particularly when the computer system includes numerous processors. For further information on the Strong Consistency model, see, L. Lamport, "How to Make a Multiprocessor Computer That Correctly Executes Multiprocess Programs", *IEEE Trans. on Computers,* September 1979.

Weaker memory models were developed to allow more efficient implementations of scalable multiprocessors. Unfortunately, weak memory models are more difficult to understand than Strong Consistency models, and they constrain the way parallel software programs can be written. Implementing stronger memory models requires considerably more care on the part of hardware designers, but using weaker memory models requires a conscious effort on the part of programmers to avoid incorporating the model provided by Strong Consistency.

Additionally, the Weak Consistency model requires a program to statically insert a special synchronization instruction between two memory accesses whenever the memory locations are potentially accessed by another program at run time. The frequency of issuing such synchronization instructions may very likely be excessive and the performance of the multiprocessor system can be severely degraded. Also, the addition of the synchronization instructions makes it more difficult for multiprocessor software to be compatible with the Stronger Consistency model.

Thus, the choice of a memory model involves making a trade-off between what is convenient for programming versus what provides the potential for high performance in hardware. For more information on this trade-off, see, J. Hennessy et al., "Hardware/Software Tradeoffs for Increased Performance", *Proc. Symp. Architectural Support for Programming Languages and Operating Systems,,* (1982), pp.2–11 or K. Gharachorloo et at., "Performance Evaluation of Memory Consistency Models for Shared Memory Multiprocessors", *Proc. Symp. on Architectural Supports for Programming Languages and Operating Systems,* (April 1991), pp. 245–257.

The predominate answer to this problem has been to adopt a Firm Consistency model, also known as processor consistency model, which follows the Strong Consistency model by maintaining the sequence of memory accesses in the sequential order appearing on the executing program, except in one situation. When a Load is issued after a Store to a different memory location, the Firm Consistency model allows the Load to bypass the Store if they don't overlap any memory locations.

Although the Firm Consistency model provides portable software which is convenient to program, it does not provide the high performance that the Weak Consistency model does. What is needed is a Firm Consistency model that is able to achieve the performance of a Weak Consistency model.

SUMMARY OF THE INVENTION

According to the present invention, a method is provided of supporting firm consistency and out-of-order instruction execution by a processor in a data processing system comprising a plurality of processors, a cache, and system memory, each processor issuing memory operations, including store and load, the method comprising the steps of issuing a store instruction requesting that a value be stored in memory; generating a store address; generating a touch command directed to the cache requesting the exclusive status of a block of memory corresponding to the store address; if the block is held exclusively by the cache, finishing the touch command; if the block is not held exclusively by the cache, issuing a command to system memory requesting the block be sent to the cache in an exclusive state; and when all instructions issued prior to the store instruction have completed execution, writing the store data associated with the store instruction to the cache.

According to the present invention, a method is provided of supporting firm consistency and out-of-order instruction execution by a processor in a data processing system comprising a plurality of processors, a cache, and system memory, each processor issuing memory operations, including store and load, the method comprising the steps of: consecutively issuing a plurality of load instructions in an issuing processor, wherein the loads may finish execution in the processor non-consecutively; and if an invalidation request on data which was the subject of a finished load is received by the issuing processor prior to the finished load being completed, canceling the finished Load.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred model of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is a novel implementation of a firm consistency memory model. Its performance can be very close to that of the weak consistency model but without requiring the software to frequently use synchronization operations. With the mechanisms of i) speculative loads of data to registers and ii) preload of data to the processor's cache for data to be stored, the order of memory accesses of load and store are not enforced as long as the order in which they are required to complete is maintained. The mechanisms rely on the out-of-order execution support in the processor, in which the execution of an instruction is broken down into three stages: pending (the instruction is waiting for the availability of a resource, e.g., data loaded from memory), finished (the instruction and its subsequent instructions can be rolled back), and completed (the effect of the instruction is confirmed in the system and cannot be rolled back). In the first mechanism, a processor is able to generate and to finish a load even if there is a pending load up front. If an error should occur due to the pending load, the finished load can be canceled. In the second mechanism, when a store is issued and there are other loads or stores ahead, the processor generates a touch for the store request to make sure the data will be in the cache when all the pending instructions are completed and it is ready to execute the store.

Figure 1:
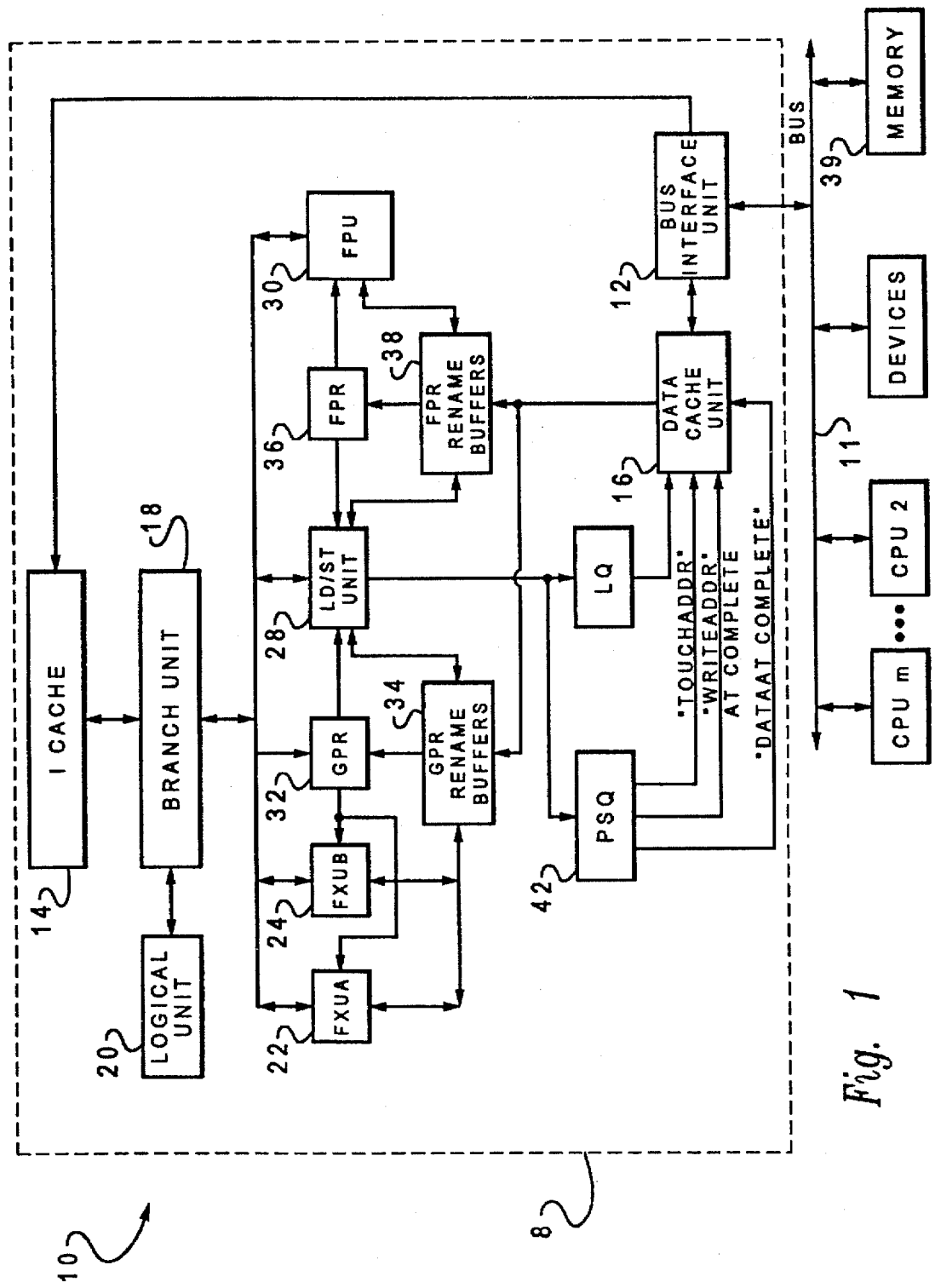
FIG. 1 depicts a data processing system for implementing a preferred embodiment of the present invention.

FIG. 1 is a block diagram of a system, indicated generally at 10, for processing information according to the preferred embodiment. In the preferred embodiment, a processor 8 of system 10 is a single integrated circuit superscaler microprocessor. Accordingly, as discussed further hereinbelow, system 10 includes various units, registers, buffers, memories, and other sections, all of which are formed by integrated circuitry. Also, in the preferred embodiment, system 10 operates according to reduced instruction set computing (RISC) techniques. As shown in FIG. 1, a system bus 11 is connected to a bus interface unit (BIU) 12 of system 10. BIU 12 controls the transfer of information between processor 8 and system bus 11.

BIU 12 is connected to an instruction cache 14 and to a data cache 16 of system 10. A high-speed cache, such as instruction cache 14 or data cache 16, enables relatively fast access to a subset of data or instructions which were previously transferred from system memory to the cache, and thus improves the speed of operation of the data processing system. Instruction cache 14 outputs instructions to a branch unit 18. In response to such instructions from instruction cache 14, branch unit 18 selectively outputs instructions to other execution circuitry of system 10.

The transfer of operands or instructions between system memory and the data or instruction cache is usually effected in fixed-length units called blocks. A block of data may be transferred in varying sizes such as tracks, sectors, lines, bytes, etc., as are known in the art. When a memory access by the branch unit 18 allows retrieval of necessary data from the data cache 16, such success is called a cache "hit", and when retrieval of necessary data cannot be performed in the cache, and so must be performed from system memory or another processor cache, such failure is called a "miss".

In addition to branch unit 18, in the preferred embodiment the execution circuitry of system 10 includes multiple execution units, namely a logical unit 20, a fixed point unit A (FXUA) 22, a fixed point unit B (FXUB) 24, a Load/Store unit (LSU) 28 and a floating point unit (FPU) 30. FXUA 22, FXUB 24, and LSU 28 input their source operand information from general purpose architectural registers (GPRs) 32 and fixed point rename buffers (FXRBs) 34. FXUA 22, FXUB 24, and LSU 28 output results (destination operand information) of their operations for storage at selected entries in fixed point rename buffers 34.

Also, FXUB 24 inputs and outputs source operand information and destination operand information to and from special purpose registers (SPRs) 40. Moreover, LSU 28 inputs source operand information from floating point architectural registers (FPRs) 36. FPU 30 inputs its source operand information from FPRs 36, floating point rename buffers (FPRBs) 38, and LSU 28. LSU 28 and FPU 30 output results (destination operand information) of their operations for storage at selected entries in floating point rename buffers 38.

In response to the instructions input from instruction cache 14, branch unit 18 selectively dispatches the instructions to selected ones of execution units 20, 22, 24, 26, 28, and 30. Each execution unit executes one or more instruction of a particular class of instructions. For example, FXUA 22 and FXUB 24 execute a first class of fixed point mathematical operations on source operands, such as addition, subtraction, ANDing, ORing and XORing. FPU 30 executes floating point operations on source operands, such as floating point multiplication and division operations.

In response to a Load instruction, LSU 28 inputs information from data cache 16 and copies such information to selected ones of rename buffers 34 and 38 and FPU 30. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11.

In response to a Store instruction from branch unit 18, the LSU 28 issues an internal touch command to the data cache 16, generates the store address, and reads data from a selected one of GPRs 32, GPR rename buffers 38, FPRs 36, and FPR rename buffers 40. The store address and the data are kept in the Pending Store Queue (PSQ) 42, and are then written to the data cache when the store instruction is ready to complete.

As information is stored at a selected one of rename buffers 34, such information is associated with a storage location (e.g. one of GPRs 32) as specified by the instruction for which the selected rename buffer is allocated. Information stored at a selected one of rename buffers 34 is copied to its associated one of GPRs 32 in response to signals from branch unit 18. Branch unit 18 directs such copying of information stored at a selected one of rename buffers 34 in response to "completing" the instruction that generated the information. In the preferred embodiment, system 10 may have multiple completions of instructions during a single cycle of system 10.

As information is stored at a selected one of rename buffers 38, such information is associated with one of FPRs 36. Information stored at a selected one of rename buffers 38 is copied to its associated one of FPRs 36 in response to signals from branch unit 18. Branch unit 18 directs such copying of information stored at a selected one of rename buffers 38 in response to "completing" the instruction that generated the information. In the preferred embodiment, system 10 may have multiple completions of instructions during a single cycle of system 10.

System 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the preferred embodiment, an instruction is normally processed as five stages, namely fetch, decode/dispatch, execute, finish, and completion.

In the fetch stage, branch unit 18 selectively inputs (from instructions cache 14) one or more instructions from one or more memory addresses storing the sequence of instructions.

In the decode/dispatch stage, branch unit 18 decodes up to three fetched instructions and selectively dispatches up to three decoded instructions to selected (in response to the decoding in the decode stage) ones of execution units 20, 22, 24, 26, 28, and 30 after reserving a rename buffer entry for each dispatched instructions' result (destination operand information). System 10 dispatches instructions in order of their programmed sequence. The branch unit assigns a unique tag to each instruction as the instruction identifier (IID).

Figure 2:
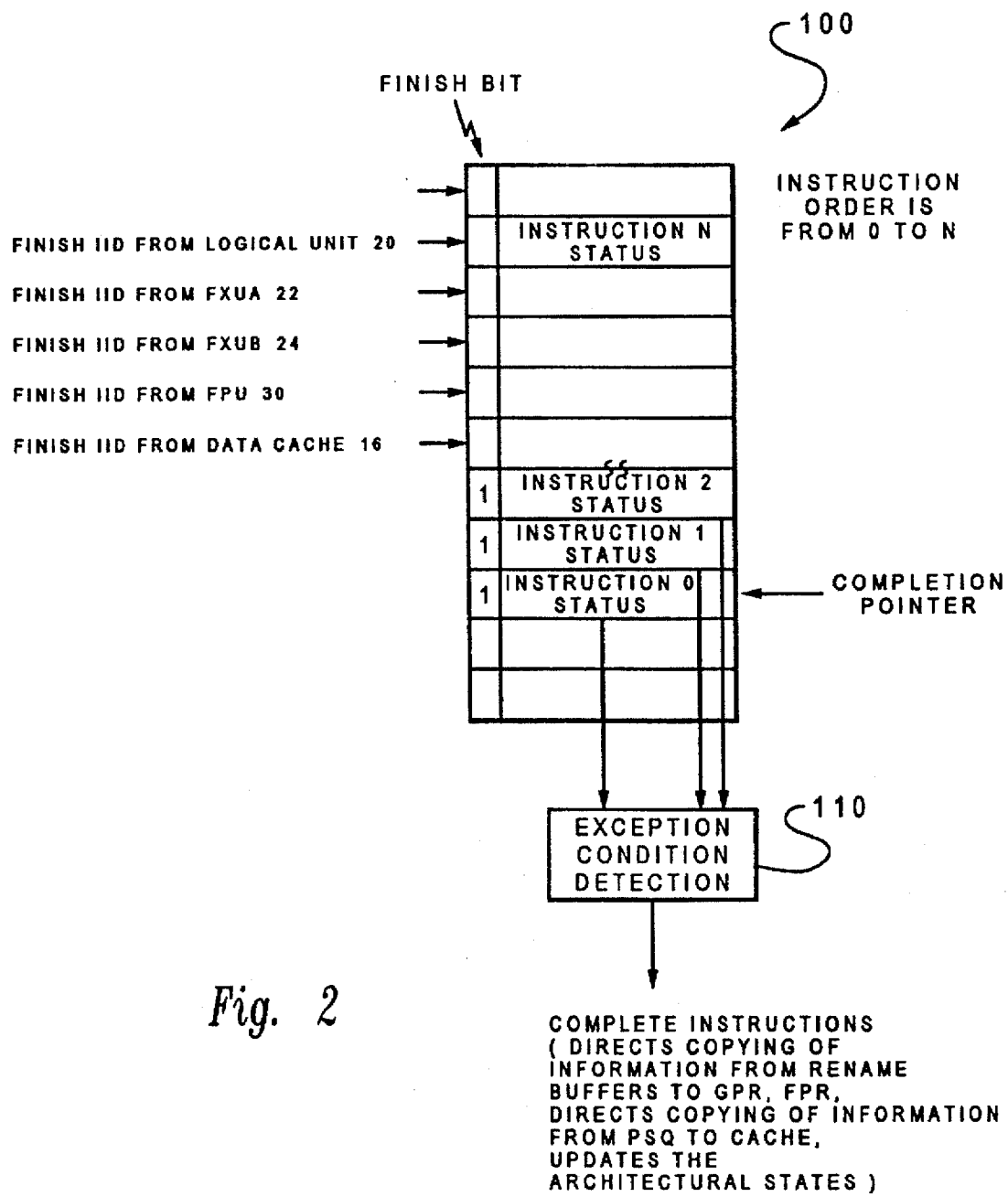
FIG. 2 shows a diagram of the Instruction Sequencing Table, according to a preferred embodiment of the present invention.

In the execute stage, execution units execute their dispatched instructions as soon as the operands are ready. In the finish stage, execution units store output results (destination operand information) at selected entries in rename buffers 34 and rename buffers 38 as discussed further hereinabove. Each execution unit signals the branch unit that it has finished executing an instruction. The execution unit sends the instruction status along with the IID back to the branch unit. As shown in FIG. 2, the branch unit saves the status of the instruction in the Instruction Sequencing Table (IST) 100 and marks the instruction as finished by setting the "finish bit". In this manner, system 10 is able to execute instructions out-of-order relative to their programmed sequence. Because some memory operations may be delayed in their issuance or their realm to the processor in the dispatch stage, the associated instructions may be executed in the execute stage out of the program sequence.

In the completion stage, the branch unit 18 reads the oldest entries in the IST 100, checks the finish bits, and if the finish bits are on, checks the status for exception conditions in the Exception Condition Detection 110, and indicates an instruction is "complete". Branch unit 18 directs the copying of information from rename buffers 34 and 38 to GPRs 32 and FPRs 36, respectively, pending the store queue to the data cache. System 10 updates its architectural states in response to the particular instruction.

In a processor which supports out-of-order execution, the completion of an instruction is in two stages: "finished" and "complete". An instruction is finished when the instruction executes without waiting for the completion of a previously issued instruction. Thus, an instruction is "finished" when it completes the execute stage and outputs the result (destination operand information) of its operation for storage at selected entries in rename buffers 34 or rename buffers 38. An instruction is "complete" when the instruction has finished and all the previously issued instructions have completed. In other words, although instructions may be executed out of the program sequence order, the instructions must be completed in the order as described by the program sequence. An instruction completes in the completion stage where the branch unit 18 indicates when an instruction is "complete". When an instruction is "complete", its result as well as its effect is visible to the system.

In accordance with Firm Consistency, execution of load and store instructions in a multiprocessing environment must follow strict programming order. A load or store initiated by a processor must be seen by the system (i.e., other processors) as initiated by the same processor. According to the present invention, two controls are instituted within the processor to maintain a Firm Consistency model, while substantially improving the performance over that of previous implementations.

The first control is an internal "Touch" mechanism. The branch unit 18 can issue load and store instructions to the Load Store Unit (LSU) 28 as soon as it receives instructions from I-Cache 14. The LSU 28 generates the store address, sends the address and an "internal touch" command to the data cache unit 16. Subsequently, LSU 28 reads the store data from a selected one of GPRs 32, GPR rename buffers 34, FPRs 36, FPR rename buffers 38.

The internal touch command directs the data cache 16 to check if the block to which data is being stored is held exclusive in the data cache. If the block is held exclusive in the data cache 16, the data cache finishes the touch command. If the block is not held exclusive in the data cache 16, the data cache issues a command to the Bus Interface Unit (BIU) 12 to request that the block brought into this data cache 16 from memory 39 or from other processors in the system be brought in as exclusive (i.e., store request to the block). In both cases, the address and the store data are stored in the Pending Store Queue (PSQ) 42. When the store instruction is next to be "complete" the data in the PSQ is written to the data cache.

By using the "Touch" operation, the processor is able to prepare for the store as soon as the LSU 28 finishes generating the address. By the time the data is ready to be written to the data cache 16, the block most likely has been established in the data cache. The processor maintains Firm Consistency by not issuing the store before completing prior instructions, yet it allows the requesting of the block to be performed before prior instructions to the store complete. The request for the memory block and the write operation have been overlapped, thus, improving the performance of the store operation.

According to the present invention, a second control is the "Finished Load Cancellation". In some situations, an issued Load may return to the LSU 28 before a prior issued Load, allowing the instruction for the later issued Load to be executed before a previous instruction. Although the processor can have any number of outstanding Loads (Loads which have been issued to data cache 16 but have not returned to the requesting execution unit) at the same time, and they can finish in any order, the present invention requires that Firm Consistency be maintained. Therefore, the Loads must be completed in their order of issue.

For example, consider two outstanding Loads, including a first issued Load which causes a cache miss, and a second outstanding Load which hits the cache. According to the present invention, the processor can proceed with the second Load and execute its associated instruction, while waiting for the first Load to return and its instruction complete. When the first Load is returned to the execution unit, the instruction is executed and completed. Thereafter, the second Load instruction is completed and its result is committed in the system.

Firm Consistency requires that all processors view other processors as executing Loads relative to other Loads in sequential order. The present invention, however, is allowing out-of-order execution of Loads within a system operating in the Firm Consistency model. The Finished Load Cancellation control of the present invention allows such out-of-order execution in a processor operating in Firm Consistency model. By allowing Load instructions to be executed when their operands are available, the performance of the processor is improved by taking advantage of out-of-order execution. The Finished Load Cancellation enables the processor to continue work on instructions that are ready for execution, rather than idly waiting for the next successive outstanding instruction to be executed, and still provide Firm Consistency. According to the present invention, Firm Consistency is maintained by canceling a finished Load instruction when a "finished" load instruction, as executed by a local processor, is invalidated by the system (i.e., other processors or devices). That is, the load is cancelled when the data for the "finished" load instruction is stall. The local processor must re-execute the load instruction to obtain the new data.

An example of the preferred embodiment is to consider the following sequences of instructions being executed in two processors in the system.

| Processor1 | Processor2 |
| --- | --- |
| load a | — |
| — | store b |
| — | store a |
| load b | — |

Processor 1 had the block that contains "b" in its cache. Processor 2 has the block that contains "a" in its cache. Processor 1 executes a "load a" and detects a miss. It then generates a request for "a", and according to the present invention, continues to execute and finishes "load b".

Before processor 1 receives the block that contains "a", it receives an invalidation from processor 2 to obtain the line that contains "b". Therefore, in a Firm Consistency point of view, when processor 1 gets the block that contains "a", it does not have the block that contains "b" anymore. The finished "load b" instruction in processor 1 must be re-executed.

According to a preferred embodiment of this invention, there is a time window (XI Window) between two load instructions where the subsequent finished load instruction is subject to cancellation due to invalidation. This window is shown below:

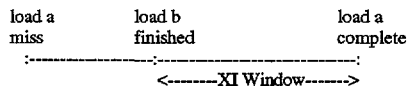

In the preferred embodiment, the "XI window" extends from the time when a load or store instruction causes a miss to the time when that load or store completes. This is shown graphically below:

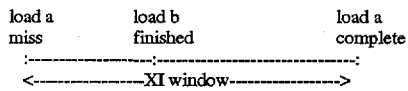

Within the "XI window", if there is an invalidate that hits a finished load or store instruction (i.e., load b), then the load or store instruction that causes the miss (i.e., load a) is marked so that when the branch unit completes that instruction (i.e., load a), it cancels all subsequent instructions, re-fetches the instruction for the complete load or store instruction (i.e., load a) and re-execute the subsequent instructions. There is a small performance degradation from executing instructions that are subsequently canceled. However, the above scenario is relatively infrequent. The substantial performance enhancement provided by out-of-order execution significantly outweighs the depredation introduced by the Finished Load Cancellation control.

Cancellation of Finished Loads can occur in various ways. First, all finished Loads and any subsequent instructions can be canceled. Second, only the finished Load being invalidated is canceled. This requires a full-address comparator at each finished Load. Third, only the finished Loads that fall into the same address group of the data being invalidated are canceled. This requires a semi-address comparator at each finished Load (e.g. the smallest is the odd and even address comparison).

Figure 3:
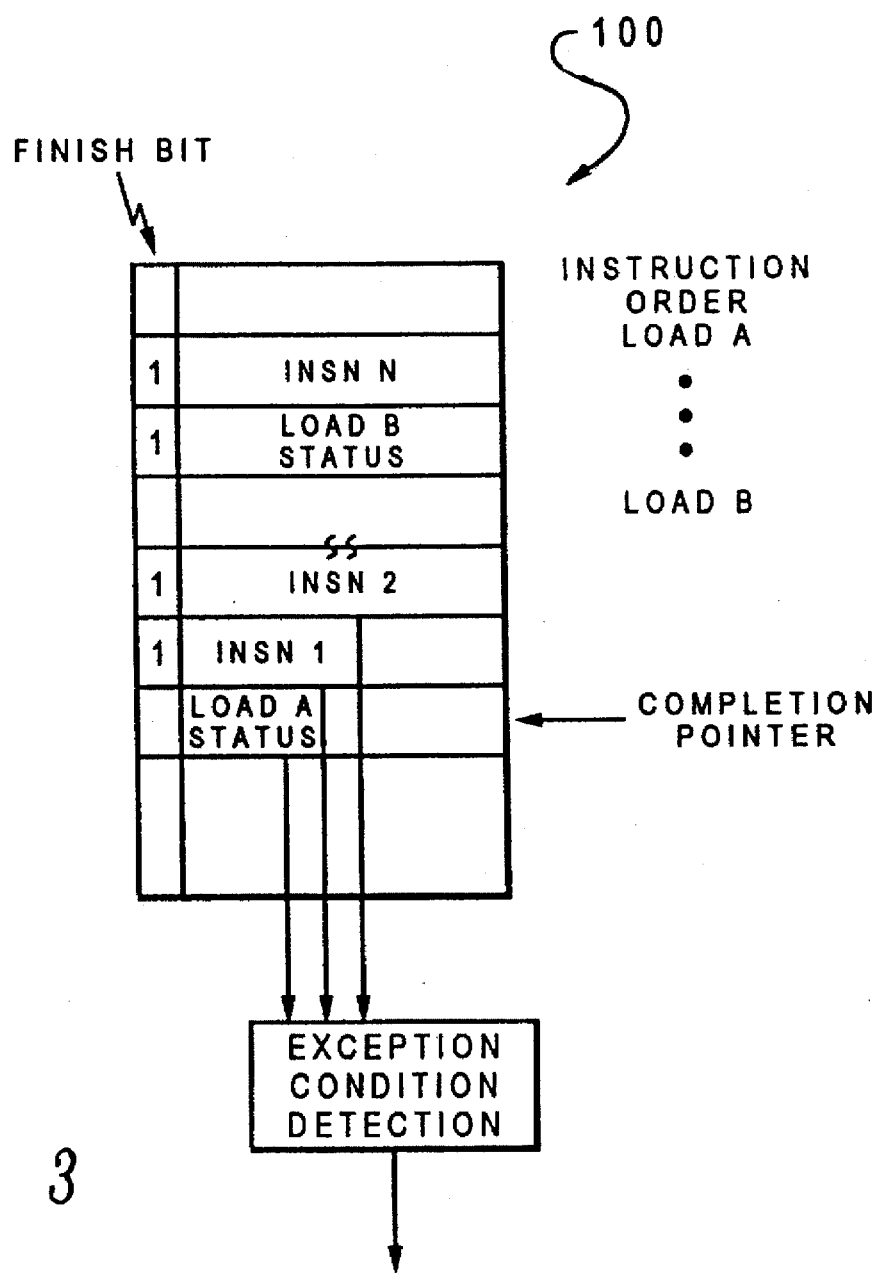
FIG. 3 depicts a diagram of the Instruction Sequencing Table using the Cancellation of Finished Loads support mechanism, according to a preferred embodiment of the present invention.

FIG. 3 depicts an implementation in which all finished loads and any subsequent instructions are cancelled. While processor 8 is waiting for data from the "load A" instruction, it executes and finishes subsequent instructions. When data for the load A instruction comes back, the Data Cache Unit 16 finishes the load A instruction. If there is no exceptions associated with the load A instruction, the Data Cache Unit 16 indicates that fact in the status field in the IST 100, and BRU 18 completes the load A and subsequent instructions. If there is an exception associated with the load A instruction, the data cache unit 16 indicates that fact in the status field in the IST 100 and the BRU 18 cancels the subsequent instructions, and re-issues them.

When the controls of the present invention are utilized, the memory delay between a firm and a weak consistency model becomes insignificant. Therefore, the significance of this invention is to allow a multiprocessor system to run in a Firm Consistency model as efficiently as it would in a weak consistency model. Moreover, because the present invention does not require the insertion of synchronization instructions, it is expected that a firmly consistent multiprocessor system of the present invention can be even more efficient than a weak consistency one.

In summary, the present invention provides two processor controls for supporting efficient Firm Consistency while allowing out-of-order execution of Load instructions. The Touch control operates when the processor stores a subsequent Store in a pending Store buffer while awaiting any outstanding Loads or Stores. The efficiency of the pending Store is improved by issuing a Touch of the data which pre-loads the line of data in the cache that is the subject of the store. The processor can complete out-of-order execution of a subsequently issued Load relative to a prior Load, but only to its finished state. The subsequently issued Load is not allowed to complete until the prior Load is completed. The Finished Load Cancellation control ensures that Firm Consistency is maintained by canceling any finished Loads, and subsequent instructions, when the subject of the Load is the same as an invalidation request from a multiprocessor. In conclusion, the present invention has provided processor controls that enable out-of-order execution of Loads and more efficient execution of Stores in a Firm Consistency multiprocessor environment.

While the invention has been particularly shown and described with reference to a preferred embodiment, it will be understood by those skilled in the art that various changes in form and detail may be made therein without departing from the spirit and scope of the invention.

What is claimed:

1. A method of supporting firm consistency and out-of-order instruction execution by a particular processor in a data processing system comprising a plurality of processors, a cache associated with said particular processor, and system memory, each processor issuing memory operations, including store and load, the method comprising the steps of:

issuing first and second instructions, wherein said first instruction precedes said second instruction in a consecutive order, and wherein said second instruction is a store instruction requesting that store data be stored in memory;

prior to completion of said first instruction, generating a store address for said store instruction;

prior to completion of said first instruction, generating a touch command directed to the cache requesting the exclusive status of a block of memory corresponding to the store address;

if the block is not held exclusively by the cache, issuing a command to system memory requesting the block be sent to the cache in an exclusive state; and in response to completion of all instructions preceding said store instruction in said consecutive order, writing the store data associated with the store instruction to the cache.

2. A method according to claim 1, wherein each processor further comprises a pending store queue, further comprising the step of storing the store address and store data in a pending store queue, prior to the step of writing the store data to the cache.

3. A method of supporting firm consistency and out-of-order instruction execution by a processor in a data processing system comprising a plurality of processors and system memory, each processor issuing memory operations, including store and load, the method comprising the steps of:

consecutively issuing a plurality of instructions including a load and at least one store in an issuing processor, wherein the load can finish execution in the issuing processor non-consecutively with respect to the store;

temporarily recording a consecutive order of all of said plurality of instructions in a completion table pending completion;

detecting an invalidation request from another processor among said plurality of processors;

in response to receipt of an invalidation request from another processor among said plurality of processors at said issuing processor, said invalidation request indicating at least a portion of an address, determining if said at least a portion of an address within said invalidation request matches a corresponding portion of an address associated with a finished load recorded in said completion table; and in response to said determination, canceling the finished load.

4. A method according to claim 3, wherein the step of canceling the finished load further comprises canceling all instructions following the finished load.

5. A data processing system comprising:

a plurality of processors capable of performing out-of-order execution of instructions, each processor issuing memory operations, including store and load;

a separate cache associated with each processor;

system memory;

means for issuing first and second instructions, wherein said first instruction precedes said second instruction in a consecutive order, and wherein said second instruction is a store instruction requesting that store data be stored in memory;

means for generating a store address for said store instruction prior to completion of said first instruction;

means for generating a touch command directed to the cache requesting the exclusive status of a block of memory corresponding to the store address, said touch command being generated prior to completion of said first instruction;

means, responsive to the block not being held exclusively by the cache, for issuing a command to system memory requesting the block be sent to the cache in an exclusive state; and means for writing the store data associated with the store instruction to the cache in response to completion of all instructions preceding said store instruction in said consecutive order.

6. A data processing system according to claim 5, wherein each processor further comprises a pending store queue for storing the store address and store data, wherein the store data and store address are written to the pending store queue prior to the store data being written to the cache.

7. A data processing system comprising:

a plurality of processors capable of performing out-of-order execution of instructions, each processor issuing memory operations, including store and load;

system memory;

means for consecutively issuing a plurality of instructions including a load and at least one store in an issuing processor, wherein the load can finish execution in the issuing processor non-consecutively with respect to the store; and a completion table for temporarily recording a consecutive order of all of said plurality of instructions pending completion;

means for detecting an invalidation request from another processor among said plurality of processors;

means, responsive to receipt of an invalidation request from another processor among said plurality of processors at said issuing processor, said invalidation request indicating at least a portion of an address, for determining if said at least a portion of an address within said invalidation request matches a corresponding portion of an address associated with a finished load recorded in said completion table; and means, responsive to said determination, for canceling the finished load.

8. A data processing system according to claim 7, further comprising means for canceling all instructions following the finished load.

9. The method of claim 3, wherein said step of canceling the finished load is performed only if said invalidation request is received by said issuing processor subsequent to said issuing processor finishing said finished load and prior to said issuing processor completing a second load among said plurality of instructions that precedes said finished load in said consecutive order.

10. The data processing system of claim 7, wherein said means for canceling the finished load performs said cancellation only if said invalidation request is received by said issuing processor subsequent to said issuing processor finishing said finished load and prior to said issuing processor completing a second load among said plurality of instructions that precedes said finished load in said consecutive order.

* * * * *

UNITED STATES PATENT AND TRADEMARK OFFICE
CERTIFICATE OF CORRECTION

PATENT NO. : 5,699,538
DATED : December 16, 1997
INVENTOR(S) : Le et al.

It is certified that error appears in the above-identified patent and that said Letters Patent is hereby corrected as shown below:

Column 5, line 60: change "realm" to --return--

Column 8, line 29: change "depredation" to --depreciation--

Signed and Sealed this

Twenty-first Day of April, 1998

Attest:

BRUCE LEHMAN

Attesting Officer

Commissioner of Patents and Trademarks